United States Patent
Vehviläinen

Patent Number: 5,822,470
Date of Patent: Oct. 13, 1998

[54] METHOD FOR PICTURE SHARPENING IN A DIGITAL VIDEO TRANSMISSION SYSTEM USING SIGNAL COMPRESSION

[75] Inventor: Markku Vehviläinen, Tampere, Finland

[73] Assignee: Nokia Technology GmbH, Pforzheim, Germany

[21] Appl. No.: 598,640

[22] Filed: Feb. 6, 1996

[30] Foreign Application Priority Data

Feb. 6, 1995 [FI] Finland ................................. 950511

[51] Int. Cl.$^6$ .................................................. G06F 17/10
[52] U.S. Cl. ........................ 382/270; 358/457; 358/261.3
[58] Field of Search .................................. 382/270–273; 358/261.1–261.3, 457, 535

[56] References Cited

U.S. PATENT DOCUMENTS

| | | | |
|---|---|---|---|
| 4,862,263 | 8/1989 | Strobach et al. | 358/135 |
| 5,293,434 | 3/1994 | Feig et al. | 382/56 |
| 5,301,027 | 4/1994 | Kiyofuji et al. | 348/589 |
| 5,523,847 | 6/1996 | Feig et al. | 358/261.3 |
| 5,539,836 | 7/1996 | Babkin | 382/250 |

FOREIGN PATENT DOCUMENTS

| | | |
|---|---|---|
| 0396846 | 11/1990 | European Pat. Off. . |
| 0509743 | 10/1992 | European Pat. Off. . |
| 0571171 | 11/1993 | European Pat. Off. . |

*Primary Examiner*—David K. Moore
*Assistant Examiner*—Stephen Brinich
*Attorney, Agent, or Firm*—Ware, Fressola, Van Der Sluys & Adolphson LLP

[57] ABSTRACT

The invention relates to a method for processing a data signal which is transformed into an n-dimensional matrix form and which is to be processed by an n-dimensional quantizing matrix. In the invention the n-dimensional quantizing matrix is processed by an n-dimensional transfer function matrix before processing the data signal. In order to form the transfer function matrix, at least one transfer function is selected, and it is given a fixed point in the n-dimensional transfer matrix. At least a part of the elements of the transfer function matrix are processed by at least one transfer function, so that elements at a predetermined distance from the fixed point are processed by a processing quantity dependent on the transfer function.

15 Claims, 7 Drawing Sheets

| 16 | 16 | 19 | 22 | 26 | 27 | 29 | 34 |
|----|----|----|----|----|----|----|----|
| 16 | 16 | 22 | 24 | 27 | 29 | 34 | 37 |
| 19 | 22 | 26 | 27 | 29 | 34 | 34 | 38 |
| 22 | 22 | 26 | 27 | 29 | 34 | 37 | 40 |
| 22 | 26 | 27 | 29 | 32 | 35 | 40 | 48 |
| 26 | 27 | 29 | 32 | 35 | 40 | 48 | 58 |
| 26 | 27 | 29 | 34 | 38 | 46 | 56 | 69 |
| 27 | 29 | 35 | 38 | 46 | 56 | 69 | 83 |

Fig. 4a

| 16 | 17 | 18 | 19 | 20 | 21 | 22 | 23 |
|----|----|----|----|----|----|----|----|
| 17 | 18 | 19 | 20 | 21 | 22 | 23 | 24 |
| 18 | 19 | 20 | 21 | 22 | 23 | 24 | 25 |
| 19 | 20 | 21 | 22 | 23 | 24 | 25 | 27 |
| 20 | 21 | 22 | 23 | 24 | 25 | 27 | 28 |
| 21 | 22 | 23 | 24 | 25 | 27 | 28 | 30 |
| 22 | 23 | 24 | 25 | 27 | 28 | 30 | 31 |
| 23 | 24 | 25 | 27 | 28 | 30 | 31 | 33 |

| j \ i | 1 | 2 | 3 | 4 | 5 | 6 | 7 | 8 |
|---|---|---|---|---|---|---|---|---|
| 1 | 1,0000 | 1,0469 | 1,1524 | 1,2373 | 1,2380 | 1,1539 | 1,0481 | 1,0000 |
| 2 | 1,0469 | 1,0872 | 1,1771 | 1,2442 | 1,2314 | 1,1433 | 1,0411 | 1,0002 |
| 3 | 1,1524 | 1,1771 | 1,2272 | 1,2495 | 1,2066 | 1,1112 | 1,0228 | 1,0034 |
| 4 | 1,2373 | 1,2442 | 1,2495 | 1,2235 | 1,1539 | 1,0634 | 1,0045 | 1,0178 |
| 5 | 1,2380 | 1,2314 | 1,2066 | 1,1539 | 1,0814 | 1,0186 | 1,0018 | 1,0518 |
| 6 | 1,1539 | 1,1433 | 1,1112 | 1,0634 | 1,0186 | 1,0002 | 1,0303 | 1,1067 |
| 7 | 1,0481 | 1,0411 | 1,0228 | 1,0045 | 1,0018 | 1,0303 | 1,0931 | 1,1742 |
| 8 | 1,0000 | 1,0002 | 1,0034 | 1,0178 | 1,0518 | 1,1067 | 1,1742 | 1,2314 |

| 16 | 17 | 25 | 33 | 39 | 35 | 31 | 34 |
|----|----|----|----|----|----|----|----|
| 17 | 18 | 29 | 36 | 41 | 38 | 37 | 37 |
| 25 | 29 | 36 | 41 | 43 | 43 | 36 | 38 |
| 33 | 33 | 40 | 40 | 38 | 41 | 38 | 40 |
| 33 | 39 | 40 | 38 | 39 | 37 | 40 | 50 |
| 34 | 35 | 37 | 39 | 37 | 40 | 49 | 64 |
| 28 | 29 | 31 | 35 | 38 | 47 | 61 | 81 |
| 27 | 29 | 35 | 38 | 48 | 61 | 81 | 102 |

Fig. 5d

METHOD FOR PICTURE SHARPENING IN A DIGITAL VIDEO TRANSMISSION SYSTEM USING SIGNAL COMPRESSION

TECHNICAL FIELD

The invention relates to a method for processing a data signal which is transformed into an n-dimensional matrix form and which is to be processed by an n-dimensional quantizing matrix (W(i,j)).

BACKGROUND OF THE INVENTION

In recent years the progress of digital technology has been very vigorous, and thus different methods have been developed to transmit and store a video signal in digital form. Advantages of the digital technology are i.e. better reproducibility, less interference and no wear, and that quality degradation can be avoided in a copying process. Further it is possible to include data about the contents of the stored program in a digital storage means, whereby it is easy to retrieve a desired item. The large amount of data required by a digital format has delayed the introduction of digital technology in the transmission and storage of video signals.

In a conventional television transmission a new picture is updated 25 times per second (30 times per second in the U.S.) so that usually there are quite small differences between consecutive pictures. This characteristic has been used to develop picture compression methods aiming at a reduced amount of transmitted information, and yet maintaining a sufficiently good picture quality at the receiving end.

A well-known picture compression method is presented in the MPEG standard (Moving Pictures Expert Group). The MPEG standard was designed so that it takes into account the human visual system (HVS). The aim in the compression phase is to remove all such information in the video signal that the eye can not detect in the viewing situation.

In the compression method according to the MPEG standard the picture is divided into blocks. The block size is 8×8 pixels. A macro block comprises four blocks; in other words the macro block size is 16×16 pixels. In video signal processing we can utilize the fact that consecutive pictures generally do not differ very much. In predicted pictures we try to generate the picture with the aid of other pictures. Then it is not necessary to transmit the original picture instead of the predicted picture, but only motion vectors and the error in the predicted picture generated with these vectors. At the receiving end the picture generating decoder restores the predicted picture with the aid of the motion vectors. However, a new picture generated with the aid of motion vectors only does not necessarily correspond to the correct picture, because there could also have been other changes in the picture. This error is called the prediction error. In the MPEG standard the above mentioned macro block is the smallest unit which is processed with the motion vector.

The MPEG standard defines three different picture types, namely: an internally encoded I-picture (Intra), a P-picture (Predicted) which is predicted from one picture, and a B-picture (Bi-directional) which is based on bi-directional prediction. Only data which is present in the actual picture is used for the encoding of I-pictures. In the decoding the I-pictures act as fixed points at which any accumulation of errors will stop, and the decoding can be started. A complete picture can be independently decoded only with the aid of I-pictures.

The P-pictures are generated by prediction from a previous I- or P-picture. A P-picture is not an independent picture, but it contains the prediction error, and therefore the transmission of a P-picture requires less data than the transmission of an I-picture. The P-pictures are then used for the prediction of the next P- or B-pictures. Errors can accumulate in consecutive predicted pictures. Therefore I-pictures must be transmitted sufficiently often. The B-pictures based on bi-directional prediction use as reference both the previous and the next I-picture or P-picture.

The video signal, or any data signal to be processed by the method, must be in a digital form so that the compression method according to the MPEG standard can be applied. A common color video signal comprises both luminance and chrominance information. When a video signal is digitized, both luminance and chrominance information is transformed separately, usually at a resolution of 8 bits.

In several picture compression methods the digitized video signal is processed by a discrete cosine transform (DCT) before the video signal is transmitted on the transmission link. The DCT transformation is a type of Fourier transformation which can be used to calculate the frequency spectrum of a periodic signal, in other words it can make a transformation from the time domain into the frequency domain. The term 'discrete' means in this context that discrete points instead of continuous functions are processed in the transformation. A two-dimensional transformation is required when the discrete cosine transform is used to compress an individual picture. The picture's width and height coordinates X and Y are used as variables instead of time. Moreover, the frequency is not the number of periods per second as usual, but the frequency represents e.g. the luminance gradient in the direction of the position coordinates X and Y. This is called the spatial frequency. The formula (1a) represents the DCT transformation and the formula (1b) the represents the inverse DCT transformation.

$$S_{vu} = 1/4 \ C_u C_v \sum_{x=0}^{N-1} \sum_{y=0}^{N-1} S_{yx} \cos[(2x+1)u\pi/16] \cos[(2y+1)v\pi/16] \quad (1a)$$

$$S_{xy} = 1/4 C_u C_v \sum_{x=0}^{N-1} \sum_{y=0}^{N-1} S_{vu} \cos[(2x+1)u\pi/16] \cos[(2y+1)v\pi/16] \quad (1b)$$

where:

$$C_u = 1/\sqrt{2} \text{ , when } u = 0$$

$$C_v = 1/\sqrt{2} \text{ , when } v = 0$$

else $C_u C_v = 1$
$S_{yx}$ luminance or chrominance values,
$S_{vu}$ frequency components of the DCT transformation,
$N$ size of the picture to be transformed at a time.

A picture surface containing numerous fine details will exhibit high spatial frequencies. For instance, parallel lines in the picture correspond to a frequency which is the higher the closer together they are. During the picture processing diagonal frequencies exceeding a certain limit can be quantized to a higher degree without perceptible degradation of the picture quality.

In MPEG compression the DCT transformation is made by blocks so that the block size is 8×8 pixels for the luminance signal, and for the chrominance signal an area of 16×16 pixels is used. The different block sizes are mainly due to the fact that the eye will better detect changes in the luminance than in the chrominance, so that an area of 2×2 pixels is encoded with the same chrominance value.

When for instance luminance values are transformed into the DCT domain the pixel block to be transformed is represented by the luminance values and the horizontal and vertical spatial frequencies calculated with the aid of these values. Each frequency component is calculated using all values of the block to be transformed. Thus the elements of the frequency matrix obtained by the discrete cosine transform do not correspond to single pixels in the block to be transformed.

In the frequency matrix the horizontal frequency components represent horizontal changes in the transformed block, and correspondingly the vertical frequency components represent vertical changes in the transformed block. The first element of the first row in the upper left corner of the matrix represents the zero frequency value of the picture block to be transformed, because it is proportional to the average value of the pixels in the block to be transformed.

Figure 4A:
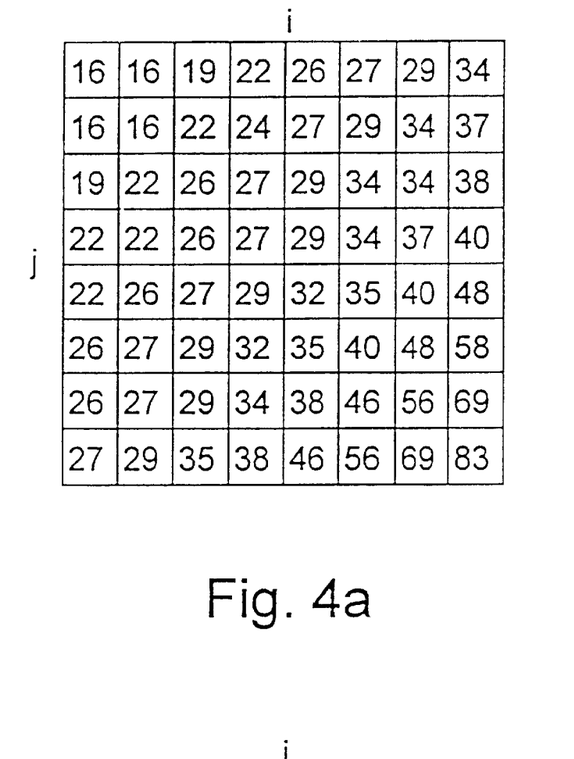
FIG. 4a shows a quantizing matrix used in the encoding and decoding of I-pictures.
Figure 4B:
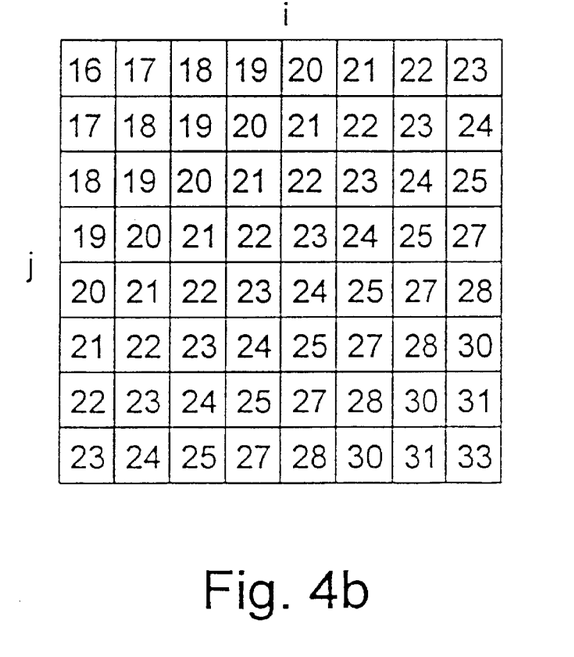
FIG. 4b shows a quantizing matrix used in the encoding and decoding of P- and B-pictures.

The frequency matrix elements ac(i,j) are quantized when the frequency matrix has been calculated, in other words after the DCT transformation the elements are put into suitable quantizing levels taking into account the human system of vision. FIG. 4a shows an example of a quantizing matrix used in the quantization of an I-picture, and FIG. 4b shows an example of the quantizing matrix W(i,j) used in the quantization of P- and B-pictures. The quantization is made according to formula (2a). A similar quantizing matrix W(i,j) according to formula (2b) is used in the inverse transformation (iDCT) made at the receiving. On the basis of the quantizing matrices (FIGS. 4a and 4b) and the formulas (2a) and (2b) we can see that fewer quantizing levels are used at higher frequencies and in the diagonal direction than at frequencies close to the zero frequency. This is particularly due to the fact that frequencies close to zero frequency and substantially horizontal and vertical frequencies are more important to the human system of vision than the higher diagonal frequencies. The variable mquant in the formulas (2a) and (2b) depends i.e. on the activity of the macro blocks and on the filling level of the data buffer used in the encoding. Thus the variable mquant can vary during the transmission of the video signal, but it does not influence the contents of the quantizing matrix.

$$QAC(i,j) = \left( \frac{16 \cdot ac(i,j)}{2 \cdot mquant \cdot W(i,j)} \right) \quad (2a)$$

$$Rec(i,j) = \frac{2 \cdot mquant \cdot W(i,j) \cdot QAC(i,j)}{16} \quad (2b)$$

When the video signal is compressed the picture quality will be somewhat degraded, mainly due to the quantization of the matrix in the DCT domain. The amount of quantization noise can vary in different parts of the picture and the quantization noise may be seen as jitter of details in the picture.

A few methods were developed for the sharpening of an MPEG compressed picture. Conventional methods realized in the picture plane are mainly optimized for analog systems, in which the noise level is substantially lower and the noise distribution follows the Gaussian curve. In analog systems the noise does not either depend on the structure of the video signal, whereas the quantization in MPEG compression causes noise depending on the structure of the picture. The amplitude of the quantization noise increases at the edge regions of details, thus strongly decreasing the local signal to noise ratio. Due to a low local signal to noise ratio, conventional sharpening methods in the picture plane do not function properly, and they amplify quantization noise, particularly at the edge regions, so that the noise will become more obvious. The quantization effect also depends on the contents of the block to be encoded, whereby adjacent blocks can be quantized to a different degree, which can make the block edges visible. On the other hand, picture plane filtering which extends over the block boundaries will amplify the differences between the blocks, whereby the block edges will become visible.

Figure 1A:
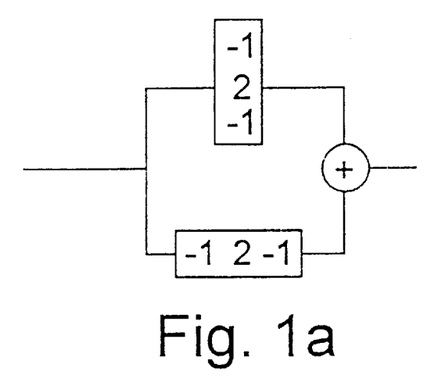
FIGS. 1a to 1c show prior art filters.
Figure 1B:
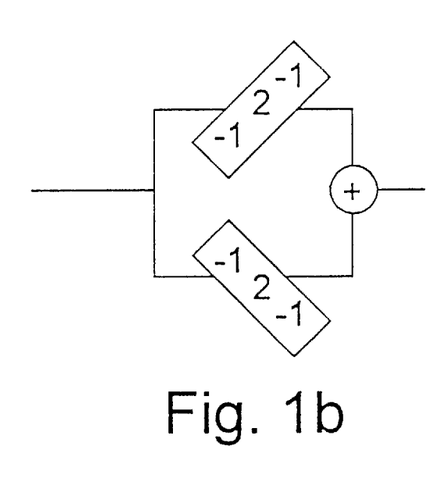
Figure 1C:
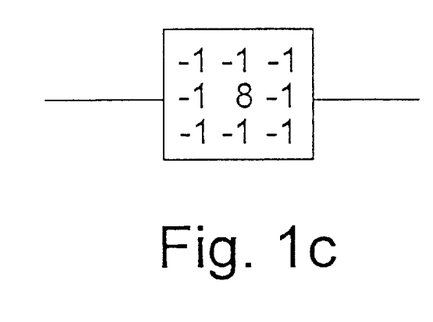

A well-known method for the sharpening of a picture is based on conventional spatial filtering, in which the filtering is made in the receiver after the decoding. The most commonly used filters are one- and two-dimensional filters. FIGS. 1a to 1c show some filter structures in use.

SUMMARY OF THE INVENTION

The object of the present invention is to provide a method with which the sharpness of the picture can be increased without enhancing block edges. The invention is based on the idea that the n-dimensional quantizing matrix is processed by an n-dimensional transfer function matrix before processing the data signal. The transfer function matrix used in the processing is preferably formed so that:

at least one transfer function is selected;

the transfer function is given at least one fixed point in the n-dimensional transfer function matrix, and at least a part of the elements of the transfer function matrix are determined with the aid of the transfer function; and at least a part of the elements of the n-dimensional transfer function matrix are formed with the aid of at least one transfer function so that transfer function matrix elements which are at a predetermined distance from the fixed point are generated with the aid of a processing quantity dependent on the transfer function.

When the elements of the transfer function matrix are generated the distance and the direction of the respective element from a given fixed point are used as parameters.

In a preferred application of the invention one-dimensional transfer function is formed using a discrete Fourier transform (DFT). A transfer function formed with a DFT transformation has preferably as many elements as there are columns in the transfer function matrix to be processed, but it is preferable to use a more accurate DFT transformation, e.g. with a 64-fold accuracy. The first element of the first row in the transfer function matrix is selected as the fixed point, and this element is given the value of the first element in the transfer function. The distance between each element of the transfer function matrix and the selected fixed point is calculated. The value of each element in the transfer function matrix is obtained with the aid of the calculated distance so that the transfer function element which most closely corresponds to the calculated distance is selected as the element of the transfer function matrix. When the distance is greater than the number of the transfer function elements, then for example the last element of the transfer function or some other suitable value is selected as the element of the transfer function matrix.

The method according to this invention provides substantial advantages over presently known methods. The increased sharpness of details appearing in the picture is not substantially dependent on their spatial direction when the method according to the present invention is used. This intra-block method does not enhance the edges of the picture blocks. When the method according to the invention is applied in the decoder of a receiver, the viewer must have a possibility to select different elements of the transfer function matrix.

BRIEF DESCRIPTION OF THE DRAWINGS

The invention is described in more detail below with reference to the enclosed figures, in which:

FIG. 5b shows in a matrix form the elements of the transfer function matrix which were calculated with the aid of the transfer function of FIG. 5a;

BEST MODE FOR CARRYING OUT THE INVENTION

Figure 2:
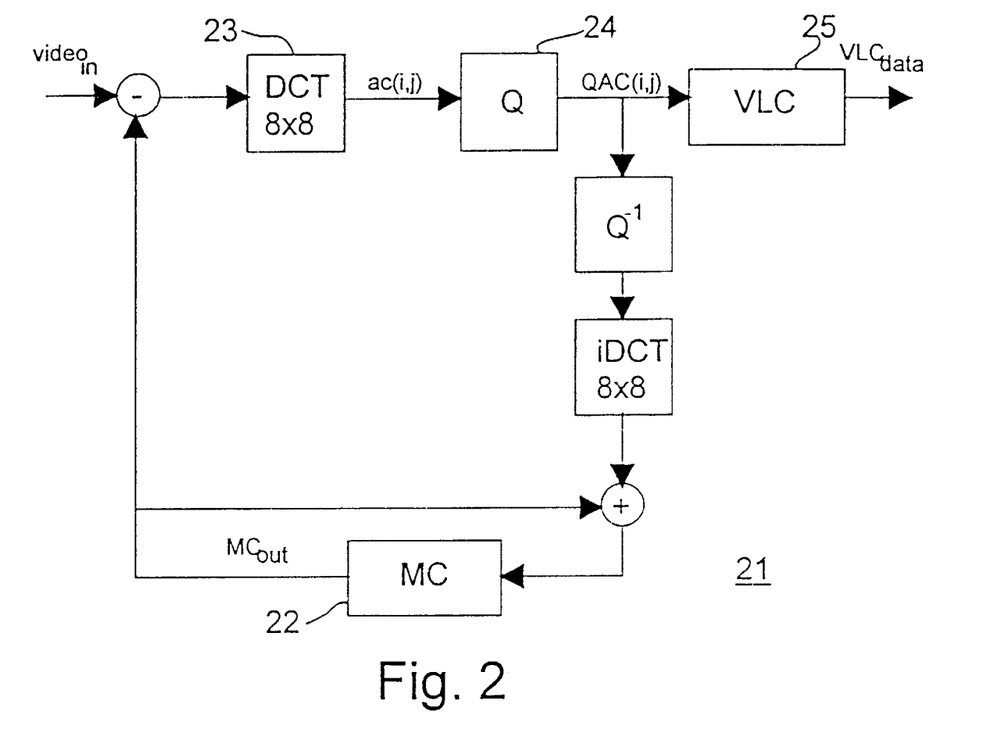
FIG. 2 shows in a block diagram the simplified structure of an encoder based on the MPEG standard.

The video signal $video_{in}$ to be transformed is supplied to the encoder 21 (ENCODER) shown in FIG. 2. In the encoder 21 the video signal $video_{in}$ according to the P- and B-pictures is subtracted from the signal $MC_{out}$ delivered by the motion compensator 22. The difference signal is supplied to the DCT transformer 23 (DCT). The I-pictures are supplied directly to the DCT transformer 23. At the output of the DCT transformer 23 we obtain a transformed signal ac(ij), where i,j=1 . . . 8, which is quantized in the quantizing means 24 according to the formula (1). The quantized signal QAC(i,j), where i,j=1 . . . 8, is then supplied to a variable length encoder 25 VLC (Variable Length Coding), so that the low frequency components are transmitted first, e.g. in the following order: QAC(1,2), QAC(2,1), QAC(3,1), QAC(2,2), QAC(1,3), QAC(1,4), QAC(2,3), and so on. The zero frequency component is compressed by a separate DPCM encoding, which generates the difference between the zero frequency components of adjacent blocks. At the output of the variable length encoder 25 we obtain an encoded video signal $VLC_{data}$, which is amplified and transmitted on the transmission path.

Figure 3:
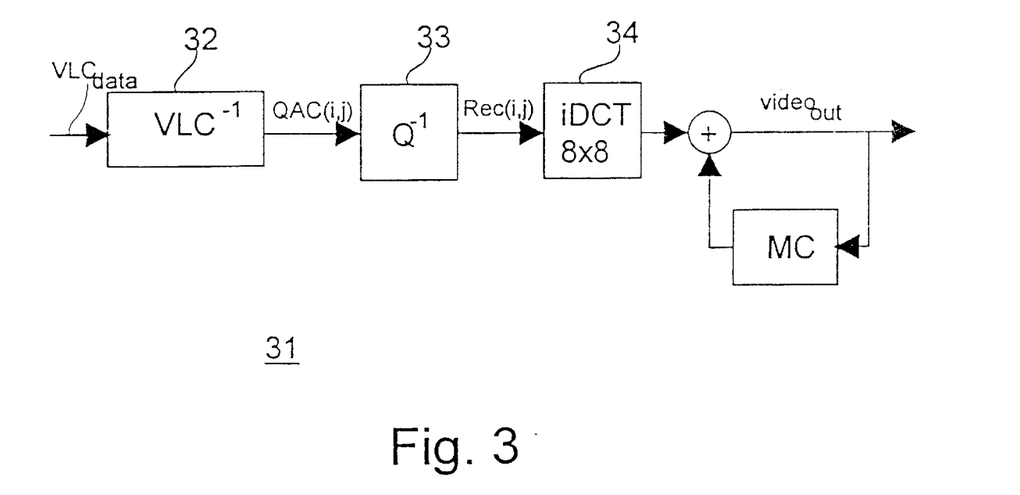
FIG. 3 shows in a block diagram the simplified structure of a decoder based on the MPEG standard.

The receiver has a decoder 31, which generates the reconstructed video signal from the encoded video signal. The encoded video signal $VLC_{data}$ is supplied to the decoder's 31 variable length encoder 32, which generates the quantized video signal QAC(i,j). The quantized video signal QAC(i,j) is supplied to a dequantizing means 33, at the output of which we get the DCT transformed signal Rec(i,j). The signal Rec(i,j) in DCT-form is processed by an inverse DCT transformation in the inverse DCT-transformer 34. The inverse-DCT transformed signal is also used for motion compensation, and only then the decoder output provides a signal $video_{out}$, which substantially corresponds to the original video signal.

The method according to the invention is preferably put into practice so that we design a suitable one-dimensional transfer function H(k) in the DFT domain, where k=1 . . . N; and N is preferably a multiple of the number of columns in the quantizing matrix. When a suitable transfer function H(k) has been designed, then with the aid of the transfer function H(k) we form a transfer function matrix P(i,j), where i,j=1 . . . M, and where each element corresponds to the equivalent elements of the quantizing matrix W(i,j);

where i,j=1 . . . M. The quantizing matrix W(i,j) of the decoder, which can be located e.g. in the receiver, is processed with the transfer function matrix P(i,j). Preferably M is 8 and N is e.g. 64*8=512, when applied to a video signal according to the MPEG standard.

In the most preferred application of this invention, the size of the transfer function matrix is selected as M=8; the number of elements in the transfer function H(k) is selected as 512, or N=64*8; and the first element P(1,1) on the first row of the transfer function matrix is selected as the fixed point. Then the selected fixed point gets the value of the first element H(1) of the transfer function, because the distance is 0. The point H(65) corresponds to the distance 1, H(129) corresponds to the distance 2, and so on. Then the distance d(x,y) of each element P(x,y), x,y=1 . . . 8, in the transfer function matrix is calculated by the formula:

$$d(x,y) = \sqrt{(x-1)^2 + (y-1)^2} \qquad (3)$$

$$d'(x,y) = 2 \cdot M - d(x,y) \qquad (4)$$

We obtain the element of the transfer function matrix with the aid of the transfer function H(k) on the basis of the distance d(x,y) so that we select that transfer function element which is closest to the calculated distance d(x,y). For instance, according to formula (3) the distance between the matrix element W(2,3) and the quantizing matrix element W(1,1) is $\sqrt{5}$ or about 143/64. Thus we obtain as the transfer function matrix element the 144th element H(144) of the transfer function. When the distance is greater than 8 we preferably utilize the symmetry of the DFT transformation when we select the transfer function matrix element, whereby we select as the value of the transfer function matrix that element, which is closest to the value d'(x,y) calculated from the transfer function according to formula (4).

Figure 5A:
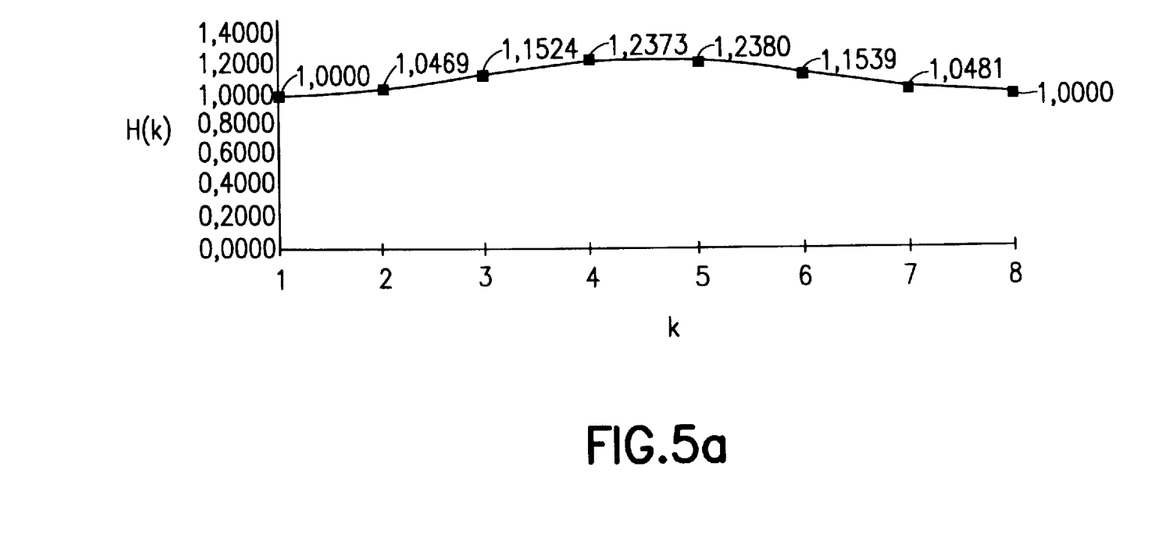
FIG. 5a shows a one-dimensional transfer function.
Figure 5B:
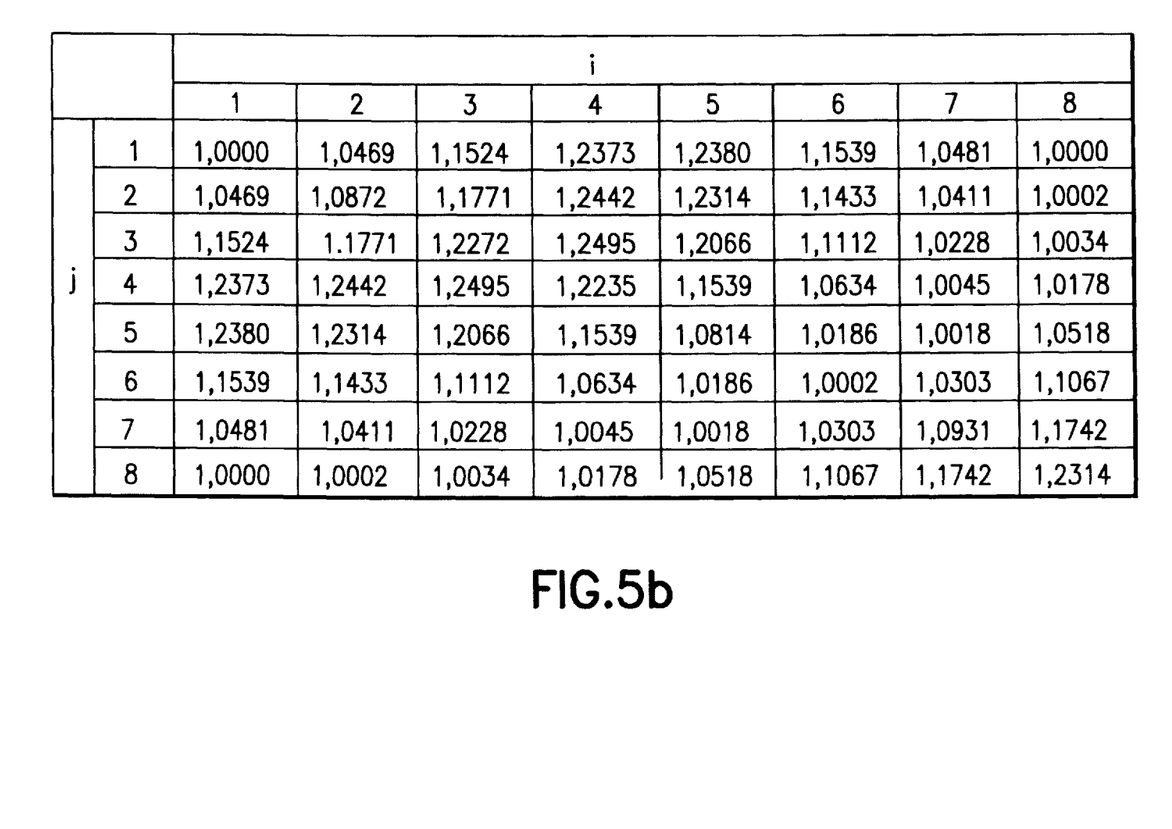
Figure 5C:
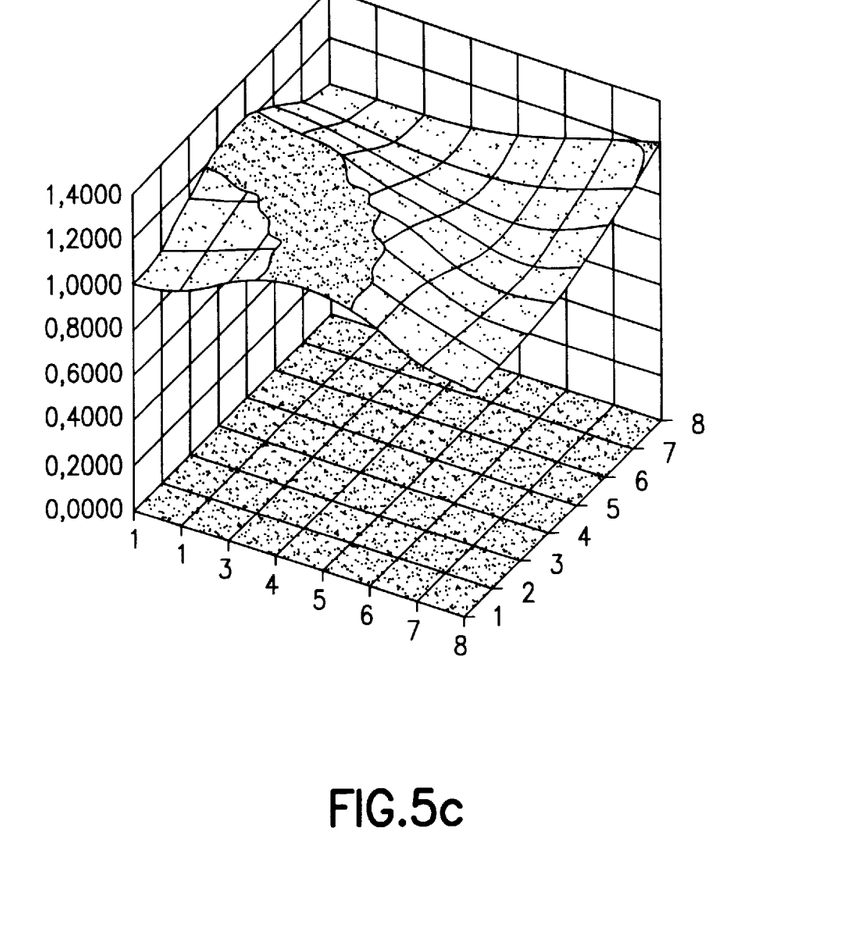
FIG. 5c shows in a 3-dimensional diagram the elements of the transfer function matrix according to FIG. 5b.
Figure 5D:
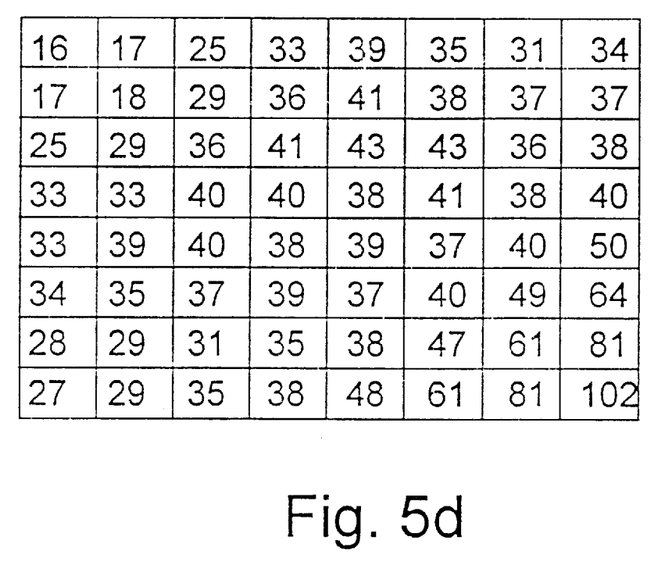
FIG. 5d shows the quantizing matrix of FIG. 4a, which is processed with the transfer function matrix according to FIG. 5b and used in the quantization and dequantization of I-pictures.

When all elements in the transfer function matrix have been calculated, the elements of the quantizing matrix W(i,j) are processed by multiplying each element of the quantizing matrix W(i,j) by the corresponding element of the transfer function matrix P(i,j). The elements of the transfer function matrix according to the above example are calculated in FIG. 5b, and FIG. 5c illustrates the transfer function matrix elements according to FIG. 5b in a three-dimensional diagram. FIG. 5d further shows the matrix used for the quantization and dequantization of the I-pictures of FIG. 4a, whereby the matrix was processed by the method according to the invention.

The processing of the quantizing matrix may be performed either in the encoder or in the decoder. If the processing is made in the encoder the video signal sender can control the processing of the video signal. In the encoder the transfer function matrix P(i,j) according to the invention is preferably combined with the quantizing means shown in FIG. 24, where also the data signal processing is made.

When the processing is made in the decoder of the receiver, then it is possible to provide the decoder with several quantizing matrices processed by different elements of the transfer function matrix so that the viewer can select a desired quantizing matrix. The viewer is also able to switch off the processing. In the receiver the transfer function matrix P(i,j) according to the invention is preferably combined with the decoder's dequantizing means 33 shown in FIG. 3, where data signal processing is also performed.

It is also possible to apply the method according to the invention so that we select a suitable one-dimensional transfer function H(k), where k=1 . . . M. The elements on the first row in the transfer function matrix P(i,j) are processed by the corresponding elements of the transfer function, in other words the element P(1,1) of the transfer function matrix is multiplied by the first element H(1) of the transfer function, the second element P(1,2) on the first row in the transfer function matrix is multiplied by the second element H(2) of the transfer function, and so on. The elements of other rows are multiplied in a corresponding way. Then the calculation is correspondingly made by columns, so that the columns of the transfer function matrix are processed by the same transfer function so that the first element P(1,1) of the first column is multiplied by the first element H(1) of the transfer function, and so on.

The method according to the present invention is not only limited to a video signal according to the MPEG standard, but the method is also applicable to other data signals, which with a suitable transformation can be brought into a matrix form. The size of the processed matrix is not limited to the size 8×8, but it could also be smaller or larger than this.

In the method according to the present invention the transfer function can also depend on several variables, such as on the direction of the processed element in relation to the fixed point.

The invention is also applicable to the processing of signals in an n-dimensional matrix form, where n>2.

The invention is further applicable so that each element of the formed transfer function matrix P(i,j) is processed by the same weighting factor Z. The processing is preferably made so that each element of the transfer function matrix P(i,j) is multiplied by the same weighting factor Z. Particularly when this is realized in the receiver, the magnitude of the effect of the transfer function matrix can be controlled with the aid of the weighting factor in order to obtain a result which is the most suitable for the viewer. Then the processing is preferably made so that one transfer function matrix P(i,j) and one or more weighting factors Z are combined with the receiver's dequantizing means 33, whereby the factors can also be adjustable.

I claim:

1. A method for processing a video signal which is transformed into an n-dimensional matrix form and which is to be processed by an n-dimensional quantizing matrix (W(i,j)), characterized in that the n-dimensional quantizing matrix (W(i,j)) is processed by an n-dimensional transfer function matrix (P(i,j) before processing the video signal and further characterized in that in order to form the transfer function matrix (P(i,j));

at least one transfer function (H(k)) is selected;

each transfer function (H(k)) is given at least one fixed point in the n-dimensional transfer function matrix P(i,j); and at least a part of the elements of the transfer function matrix P(i,i) are formed with the aid of at least one transfer function (H(k)) so that elements of the transfer function matrix P(i,j) which are at a predetermined distance from the fixed point are generated with the aid of a processing quantity dependent on the transfer function (H(k)).

2. A method according to claim 1, characterized in that the matrices (P(i,j) W(i,j)) are two-dimensional matrices.

3. A method according to claim 1, characterized in that the element (P(1,1)) of the first row and of the first column in the transfer function matrix (P(i,j)) is selected as the fixed point.

4. A method according to claim 3, characterized in that the first element (H(1)) of the transfer function (H(k)) is selected as the fixed point of the transfer function.

5. A method according to claim 1, characterized in that the processing of the quantizing matrix (W(i,j)) is made in the step of the transmission of the video signal.

6. A method according to claim 1, characterized in that the processing of the quantizing matrix (W(i,j)) is made in the step of the receiving of the video signal.

7. A method according to claim 6, characterized in that at least one transfer function matrix (P(i,j)) and at least one weighting factor Z are used in the reception, whereby the transfer function matrix (P(i,j)) and the weighting factor Z to be actually used are selected in the processing step.

8. A device for processing a video signal transformed into an n-dimensional matrix form and to be processed by an n-dimensional quantizing matrix (W(i,j)), the device comprising;

means (24, 33) for storing the quantizing matrix (W(i,j)), and means (24, 33) for processing the video signal with the aid of the quantizing matrix (W(i,j)), characterized in that the device further comprises;

means (24, 33) for storing a transfer function matrix (P(ij)), and means (24, 33) for processing the quantizing matrix (W(i,j)) with the aid of the transfer function matrix (P(i,j))

and further characterized in that one transfer function matrix (P(i,j)) is stored in the device, and that the device further comprises means (24, 33) for storing a weighting factor Z and for selecting the transfer function matrix (P(i,j)) and weighting factor Z actually used in the processing.

9. A device according to claim 8, where the processed video signal is to be transmitted by a transmitter having an encoder, characterized in that the means for storing the quantizing matrix is located in the encoder (21) used in the transmission of the video signal.

10. A device according to claim 8, where the processed video signal is to be received by a receiver having a decoder, characterized in that the means for storing the quantizing matrix is located in the decoder (31) used in the reception of the video signal.

11. A method for picture sharpening in a digital video transmission system (21, 31) using a data signal (video$_{in}$) which is processed among other steps by the following procedure steps:

transforming the data signal (video$_{in}$) by a discrete Fourier transformation procedure (DCT) into an n-dimensional frequency matrix (ac(i,j)), quantizing the frequency matrix (ac(i,j)) by an n-dimensional quantizing matrix (W(i,j)) and a variable (mquant) for providing a quantized signal matrix (QAC (i,j)) wherein the data signal (video$_{in}$) is completely transformed by the discrete Fourier transformation procedure (DCT) before quantizing, and dequantizing the quantized signal matrix (QAC(i,j)) by the n-dimensional quantizing matrix (W(i,j)) and the variable (mquant) after receiving, characterized in that the n-dimensional quantizing matrix (W(i,j)) applied for quantizing the frequency matrix (ac(i,j)) is processed by an n-dimensional transfer function matrix (P(i,j).

12. A method for picture sharpening in a digital video transmission system (21, 31) using a data signal (video$_{in}$) which is processed among other steps by the following procedure steps:

transforming the data signal (video$_{in}$) by a discrete Fourier transformation procedure (DCT) into an n-dimensional frequency matrix (ac(i,j)), quantizing the frequency matrix (ac(i,j)) by an n-dimensional quantizing matrix (W(i,j)) and a variable (mquant) for providing a quantized signal matrix (QAC (i,j)), and dequantizing the quantized signal matrix (QAC)i,j)) by the n-dimensional quantizing matrix (W(i,j)) and the variable (mquant) after receiving, characterized in that the n-dimensional quantizing matrix (W(i,j)) applied for dequantizing the quantized signal matrix (QAC(i,j) is processed by an n-dimensional transfer function matrix (P(i,j).

13. A method for picture sharpening in a digital video transmission system (21, 31) using a data signal (video$_{in}$) which is processed among other steps by the following procedure steps:

transforming the data signal (video$_{in}$) by a discrete Fourier transformation procedure (DCT) into an n-dimensional frequency matrix (ac(i,j)), quantizing the frequency matrix (ac(i,j)) by an n-dimensional quantizing matrix (W(i,j)) and a variable (mquant) for providing a quantized signal matrix (QAC (i,j)) wherein the data signal (video$_{in}$) is completely transformed by the discrete Fourier transformation procedure (DCT) before quantizing, and dequantizing the quantized signal matrix (QAC(i,j)) by the n-dimensional quantizing matrix (W(i,j)) and the variable (mquant) after receiving, characterized in that the n-dimensional quantizing matrix (W(i,j)) applied for quantizing the frequency matrix (ac(i,j)) and the n-dimensional quantizing matrix (W(i,j)) applied for dequantizing the quantized signal matrix (QAC(i,j)) are processed by different n-dimensional transfer function matrices.

14. A digital video transmission system with improved picture sharpening using a data signal (video$_{in}$) and containing:

a transformer (23) for transforming the data signal (video$_{in}$) into an n-dimensional frequency matrix (ac(i, j)) by a discrete Fourier transform procedure (DCT)

quantizing means (24) for storing an n-dimensional quantizing matrix (W(i,j)), and for quantizing the complete Fourier transformed n-dimensional frequency matrix (ac(i,j)) with the aid of the quantizing matrix (W(i,j)) and a variable (mquant) providing a quantized signal matrix (QAC(i,j), and dequantizing means (33) also for storing the quantizing matrix (W(i,j)), and for dequantizing the quantized signal matrix (QAC(i,j) with the aid of the quantizing matrix (W(i,j)) and the variable (mquant), characterized in that in the quantizing means (24) is at least one transfer function matrix (P(i,j)) stored which processes the quantizing matrix (W(i,j)) before quantizing the complete Fourier transformed n-dimensional frequency matrix (ac(i,j)).

15. A digital video transmission system with improved picture sharpening using a data signal (video$_{in}$) and containing:

a transformer (23) for transforming the data signal (video$_{in}$) into an n-dimensional frequency matrix (ac(i, j)) by a discrete Fourier transform procedure (DCT)

quantizing means (24) for storing an n-dimensional quantizing matrix (W(i,j)), and for quantizing the complete Fourier transformed n-dimensional frequency matrix (ac(i,j)) with the aid of the quantizing matrix (W(i,j)) and a variable (mquant) providing a quantized signal matrix (QAC(i,j)), and dequantizing means (33) also for storing the quantizing matrix (W(i,j)), and for dequantizing the quantized signal matrix QAC(i,j) with the aid of the quantizing matrix (W(i,j)) and the variable (mquant), characterized in that in the dequantizing means (33) is at least one transfer function matrix (P(i,j)) stored which processes the quantizing matrix (W(i,j)) before dequantizing the quantized signal matrix (QAC(i,j).

* * * * *

UNITED STATES PATENT AND TRADEMARK OFFICE
CERTIFICATE OF CORRECTION

PATENT NO.    : 5,822,470
DATED         : October 13, 1998
INVENTOR(S)   : Markku Vehvilainen It is certified that error appears in the above-identified patent and that said Letters Patent is hereby corrected as shown below:

In column 7, line 53 (Claim 1, line 14), "P(i,i)" should be --P(i,j)--.

In column 8, line 22 (Claim 8, line 11), "(P(ij))" should be --(P(i,j))--.

Signed and Sealed this

Sixteenth Day of February, 1999

Attest:

Attesting Officer

*Acting Commissioner of Patents and Trademarks*